US009033360B2

(12) United States Patent
Davis et al.

(10) Patent No.: US 9,033,360 B2
(45) Date of Patent: May 19, 2015

(54) LIFT MECHANISM AND TILT MECHANISM FOR A POWER WHEELCHAIR

(71) Applicant: Pride Mobility Products Corporation, Exeter, PA (US)

(72) Inventors: Jonathan Davis, Exeter, PA (US); John Carminati, Exeter, PA (US); David Laslo, Ewing, NJ (US); James Patrick Mulhern, Nanticoke, PA (US)

(73) Assignee: Pride Mobility Products Corporation, Exeter, PA (US)

( * ) Notice: Subject to any disclaimer, the term of this patent is extended or adjusted under 35 U.S.C. 154(b) by 0 days.

(21) Appl. No.: 14/210,557

(22) Filed: Mar. 14, 2014

(65) Prior Publication Data

US 2014/0262566 A1 Sep. 18, 2014

Related U.S. Application Data

(60) Provisional application No. 61/792,437, filed on Mar. 15, 2013.

(51) Int. Cl.

| | |
|---|---|
| ***B62B 7/08*** | (2006.01) |
| ***A61G 5/10*** | (2006.01) |
| ***A61G 5/04*** | (2013.01) |
| ***A61G 5/14*** | (2006.01) |

(52) U.S. Cl.

CPC ................ *A61G 5/1056* (2013.01); *A61G 5/04* (2013.01); *A61G 5/1059* (2013.01); *A61G 5/14* (2013.01); *A61G 5/1075* (2013.01); *A61G 5/043* (2013.01)

(58) Field of Classification Search

CPC ........................................................ B62B 7/08
USPC ............ 280/647–651, 47.4, 304.1, 30, 250.1, 280/657, 47.13; 297/35, 354.1, 311, 312
See application file for complete search history.

(56) References Cited

U.S. PATENT DOCUMENTS

| | | | | |
|---|---|---|---|---|
| 3,993,351 | A | 11/1976 | Rodaway | |
| 4,489,980 | A | 12/1984 | Friedrich | |
| 4,489,981 | A | 12/1984 | Goletski | |
| 6,540,250 | B1 * | 4/2003 | Peterson | 280/657 |
| 7,866,613 | B2 | 1/2011 | Cramer | |
| 2005/0046129 | A1 * | 3/2005 | Antonishak et al. | 280/47.4 |
| 2006/0087166 | A1 | 4/2006 | Trippensee | |
| 2007/0084648 | A1 * | 4/2007 | DuFresne et al. | 180/65.1 |
| 2009/0224121 | A1 | 9/2009 | Cramer | |
| 2012/0086184 | A1 | 4/2012 | Derks et al. | |

FOREIGN PATENT DOCUMENTS

| | | |
|---|---|---|
| WO | WO00/21478 | 4/2000 |

* cited by examiner

*Primary Examiner* — John Walters
*Assistant Examiner* — James Triggs
(74) *Attorney, Agent, or Firm* — Baker & Hostetler, LLP

(57) ABSTRACT

A lift mechanism a power wheelchair includes linear actuators on opposing sides of the chair that provide a space into which a tilt mechanism can nest when the lift mechanism is in its retracted position. The linear actuators perform both the function of operating the lift mechanism and structurally supporting at least a part of the lift mechanism. The lift mechanism and tilt mechanism are each self-contained modules that can be optionally installed into the power wheelchair.

41 Claims, 19 Drawing Sheets

70

LIFT MECHANISM AND TILT MECHANISM FOR A POWER WHEELCHAIR

CROSS-REFERENCE TO RELATED APPLICATIONS

This claims the benefit of U.S. Patent Application Ser. No. 61/792,437 filed Mar. 15, 2013, the disclosure of which is hereby incorporated by reference as if set forth in its entirety herein.

BACKGROUND

This invention relates to personal mobility products and more particularly to aids for lifting and/or seats for people with low mobility.

Conventional power wheelchairs for the rehabilitation market often have a power base unit and a seating system that is capable of both tilting the chair and lifting the chair. A tilting capability is useful to manage pressure on the occupant's skin. A lifting capability is useful to enable the occupant to access heights.

FIGS. 15A and 15B illustrate a lift and tilt system for a power wheelchair from Balle Lift Systems. The system 200 includes a lift frame 202, a pair of opposing scissors lift mechanisms 204, a lift actuator 206, a tilt frame 210, a tilt mechanism 212, and a tilt actuator 214. Each one of the left and right scissor mechanisms has a first leg 220 and a front leg 230 (that is, the lower portion is toward the front). A lower end 232 of front leg 230 is attached to frame 202 at a pivot 234. A lower end 222 of first or rear leg 220 has a sliding support 224 on frame 202.

When lift actuator 206 operates to lower the lift system from its extended position of FIG. 15A to its retracted position of FIG. 15B, actuator 206 retracts, lower end 222 of scissor rear leg 220 moves rearward (that is, toward the left as oriented in FIG. 15A) from the force applied by the actuator and/or by the weight of the occupant. Frame 202 provides the support for lower end 222—that is, a surface of lower end 222 contacts a surface of frame 202 and bears on it.

FIG. 15A shows the tilt mechanism 212 in an extended position in which tilt actuator 214 is extended relative to tilt frame 210. FIG. 15B showss lift mechanism 204 and tilt mechanism 212 in a fully retracted position. Tilt frame 210 is stacked on top of lift frame 202. In some embodiments, tilt actuator 214 is offset relative to lift actuator 206 such that the actuators are side by side when in their retracted positions.

SUMMARY

The inventive aspects of a chair assembly for a power wheelchair include a pair of linear actuators on opposing sides of the chair that provide a space into which a tilt mechanism can nest when the lift mechanism is in its retracted position; a pair of linear actuators that perform both the function of operating the lift mechanism and structurally supporting at least a part of the lift mechanism; and forming the lift mechanism and tilt mechanism into self-contained modules that can be optionally installed into the power wheelchair. The lift mechanism can raise the seating height of the wheelchair for the purpose of putting the occupant near normal eye level or to access elevated objects. The tilt mechanism can move the occupant to a position that relieves pressure on a selected area of the occupant.

According to a first inventive aspect, a lift cartridge and tilt cartridge are configured in the wheelchair such that the tilt cartridge and lift cartridge nest when in the retracted position.

A chair assembly for a power wheelchair includes: a seat assembly including a seat base and a seat back; a tilt cartridge unit including an actuator, a linkage, and a frame, such that the actuator is configured to tilt the seat assembly in response to a signal from a controller; a lift cartridge unit including left and right actuators and left and right scissor mechanisms, the left actuator operatively coupled to the left scissor mechanism and the right actuator operatively coupled to the right mechanism, each scissor mechanism including first and second scissor legs, the left actuator and left scissor mechanism being located on an opposing side of the chair assembly from the right actuator and right scissor mechanism to define a central space therebetween in which the tilt mechanism nests at least when the tilt cartridge unit is in a retracted position. The lift actuators are configured to vertically lift the seat base, without tilting the seat base, in response to a signal from a controller, and the tilt actuator being configured to tilt the seat base, without lifting the seat base, in response to a signal from the controller.

Preferably, each one of the left and right scissor mechanisms includes at least one moveable connection to a portion of the corresponding actuator, and is a linear actuator, such as a power screw that translates a nut, that translates a portion of the first scissor leg. Preferably, the first scissor leg has a translatable end that is affixed to the nut, and the translatable ends of the first legs are supported entirely from the nut and are not supported by the frame, and each one of the second scissor legs has a lower end that is longitudinally fixed by the frame. The linear actuators preferably are oriented parallel to a forward-rearward axis of the chair assembly, especially where the legs are bars that are oriented parallel to the forward rearward axis.

As explained more fully below, the tilt cartridge unit can consists of a single module that can be removed from the seat assembly and from the lift cartridge unit as a module. And the lift cartridge unit consists of a single module that can be removed from the seat assembly and from the tilt cartridge unit as a module.

A corresponding method of operating a power wheelchair that includes a seat lift feature and a seat tilt feature described above includes the steps of: in response to a signal from a controller, operating a tilt actuator that is part of a tilt unit such that operation of the tilt actuator is capable of tilting a seat base frame; in response to a signal from a controller, operating left and right linear lift actuators such that operation of the actuators operates the left and right scissor mechanisms for vertical movement of the seat base frame, such that upon retraction of the scissor lift mechanisms the tilt unit nests in the space between the lift actuators. The translating step is translating the moveable connection of each one of the left and right scissor mechanisms.

According to another aspect, the actuator combines the functional movement of the lift mechanism and structural support for the lift mechanism, including that one of the scissor legs is supported by a translatable element of the actuator without direct support by the frame—in this regard, the translatable element is supported by the screw. A chair assembly for a power wheelchair includes: a tilt cartridge unit including an actuator, a linkage, and a frame such that the actuator is configured to tilt the seat assembly in response to a signal from a controller; a lift cartridge unit including left and right linear actuators and left and right scissor mechanisms on opposing sides of the chair assembly. Each one of the scissor mechanisms includes a left leg and a second leg. An end of the left scissor leg is structurally supported by a translatable element of the actuator without direct support by the frame during operation of the actuator. And the end of the second scissor leg is structurally supported by the frame. The chair includes at least one drive for operating the actuator.

In a preferred configuration, the actuator translation is approximately horizontal. In this regard, the frame is usually horizontal or almost horizontal and the actuator translation is most cases is parallel to the frame. Where the actuator is a power screw and the translatable element is a nut, and the end of the first scissor leg is pivotally connected to the nut, each one of the second scissor legs has a fixed leg that is pivotably supported by a frame such that operation of the actuator translates an end of the first leg to extend or retract the scissor mechanisms. Preferably, the opposing the power screws and scissor mechanisms being define a central space therebetween in which the tilt mechanism nests at least when the tilt cartridge unit is in a retracted position. And the linear actuators are oriented parallel to a forward-rearward axis of the chair assembly; the legs may be bars that are oriented parallel to the forward rearward axis. The tilt cartridge unit and consist of a single module that can be removed from the seat assembly and from the lift cartridge unit as a module; and the lift cartridge unit can consist of a single module that can be removed from the seat assembly and from the tile cartridge unit as a module. The lift actuators are configured to vertically lift the seat base, without tilting the seat base, in response to a signal from a controller, and the tilt actuator being configured to tilt the seat base, without lifting the seat base, in response to a signal from the controller.

According to another aspect, the tilt mechanism and the lift mechanism each are optional, which enable the wheelchair to be fitted with the appropriate mechanism at the appropriate time according to the occupant's needs. A power wheelchair having lift and tilt capabilities includes: a power base that includes a frame, wheels, a suspension, at least one motor for driving at least some of the wheels, and a controller; a seat assembly including a seat base and a seat back; an optional tilt module including an actuator, a linkage, and a frame; the tilt module being capable of being connected to the seat assembly as a standalone unit; an optional lift module including at least one motor, left and right actuators and left and right scissor mechanisms, the left actuator operatively coupled to the left scissor mechanism and the right actuator operatively coupled to the right mechanism, each scissor mechanism including first and second scissor legs, the left actuator and left scissor mechanism being located on an opposing side of the chair assembly from the second actuator and second scissor mechanism to define a central space therebetween in which the tilt module is capable of nesting at least when the tilt cartridge unit is in a retracted position. The lift actuator is configured to vertically lift the seat base, without tilting the seat base, in response to a signal from a controller, and the tilt actuator being configured to tilt the seat base, without lifting the seat base, in response to a signal from the controller.

The structure of functional components of the tilt module and the lift module are as described as above for the tilt mechanism and the lift mechanism.

BRIEF DESCRIPTION OF THE FIGURES

FIG. 7 accurately depicts the lift mechanism, except for showing the screw without threads for convenience of illustration.

DETAILED DESCRIPTION

Figure 1:
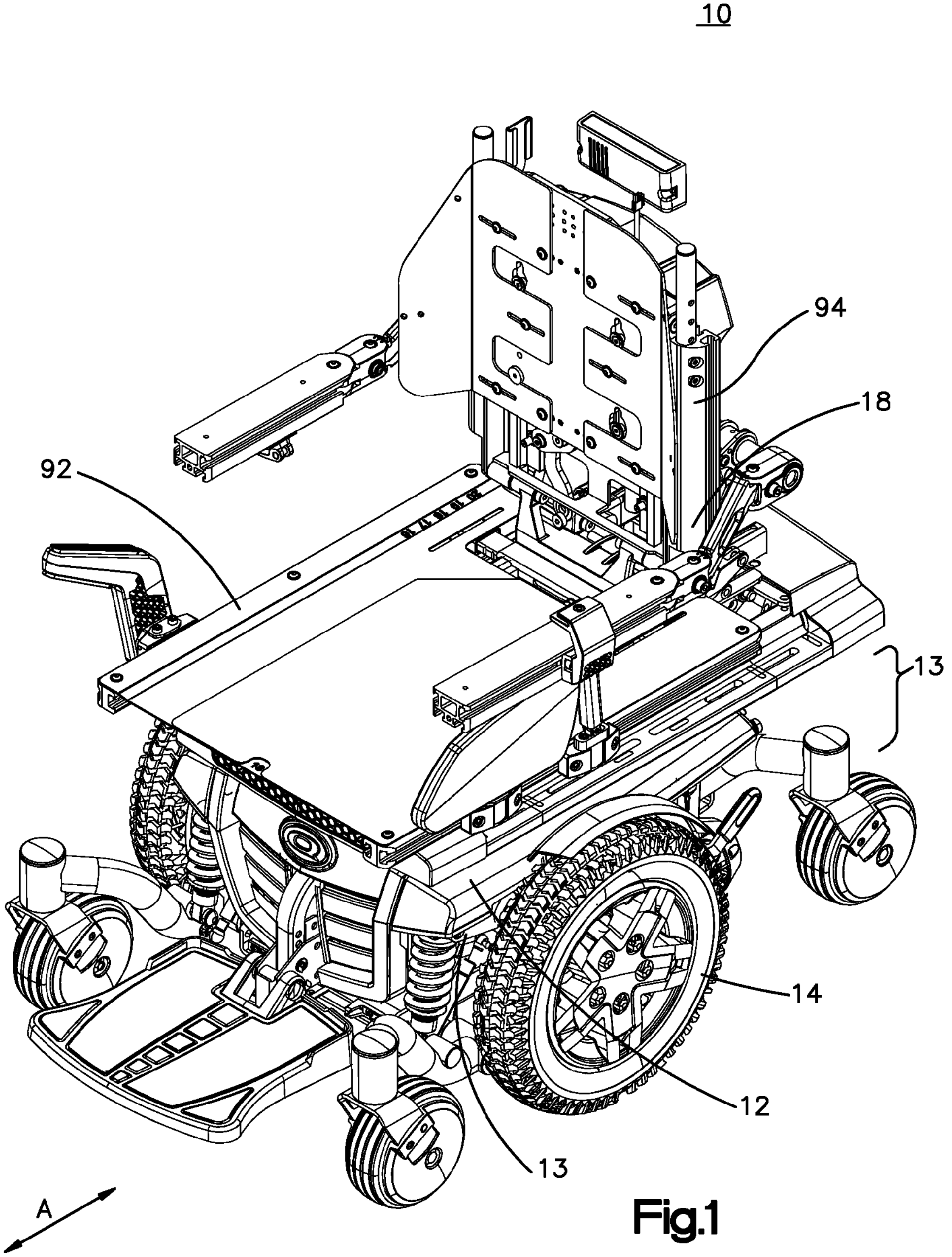
FIG. 1 is a perspective view of a wheelchair assembly of the type that can include a lift mechanism and a tilt mechanism.
Figure 2A:
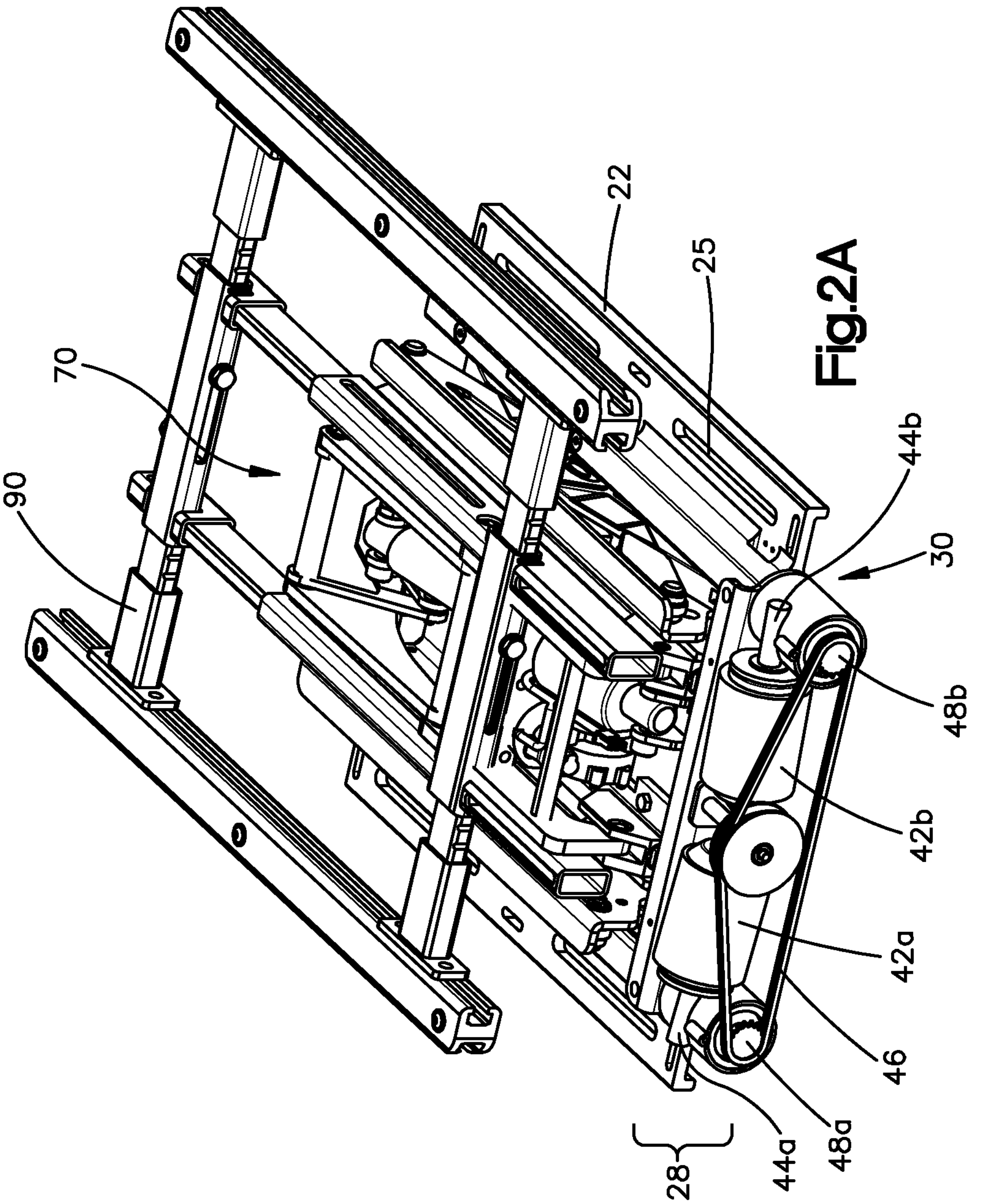
FIG. 2A is a view of the lift mechanism and the tilt mechanism combined with the rest of the wheelchair removed for clarity of illustration. The lift mechanism and the tilt mechanism are shown in their retracted positions.
Figure 2B:
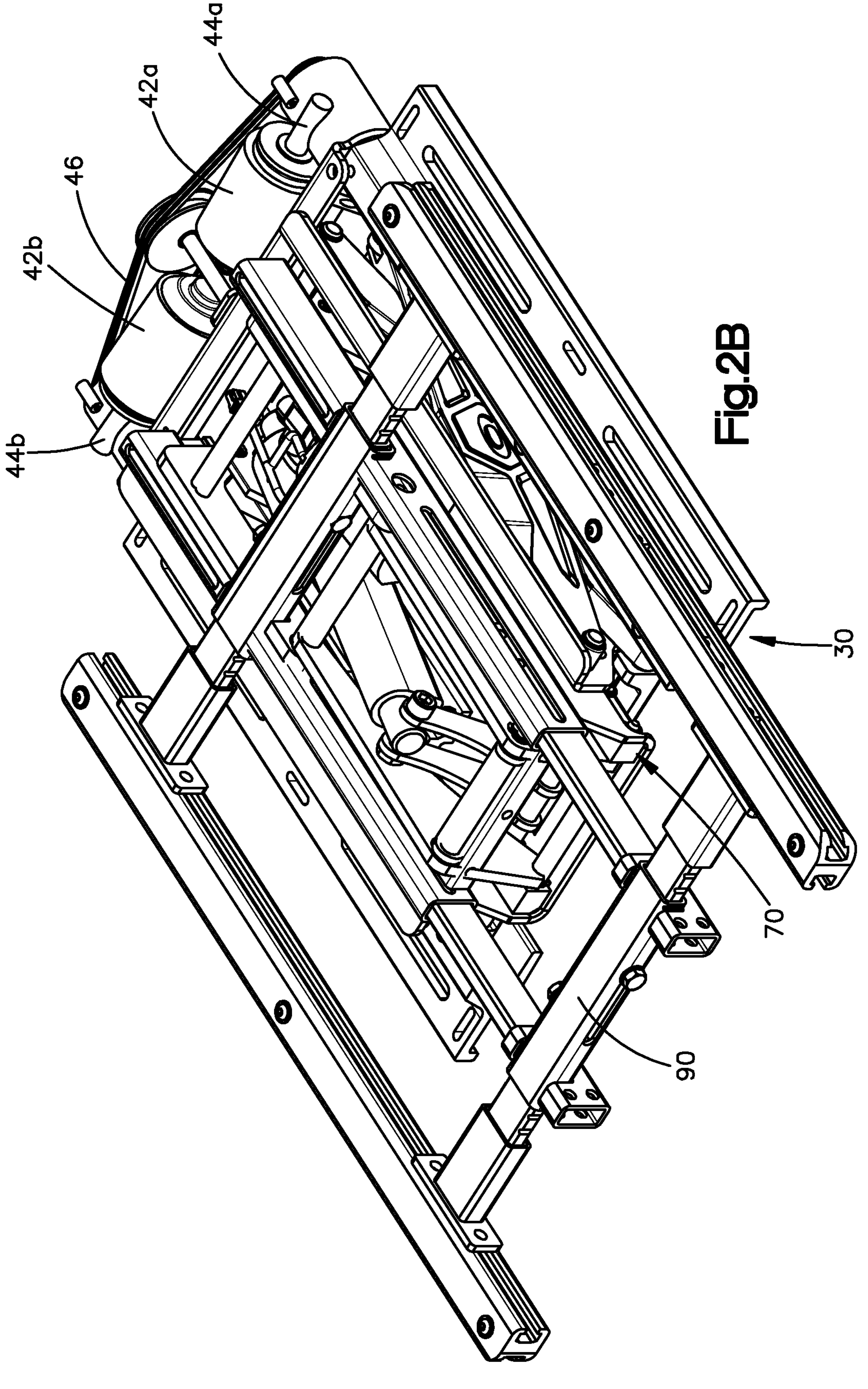
FIG. 2B is a perspective view of the lift mechanism and tilt mechanism in the positions of FIG. 2A.
Figure 3:
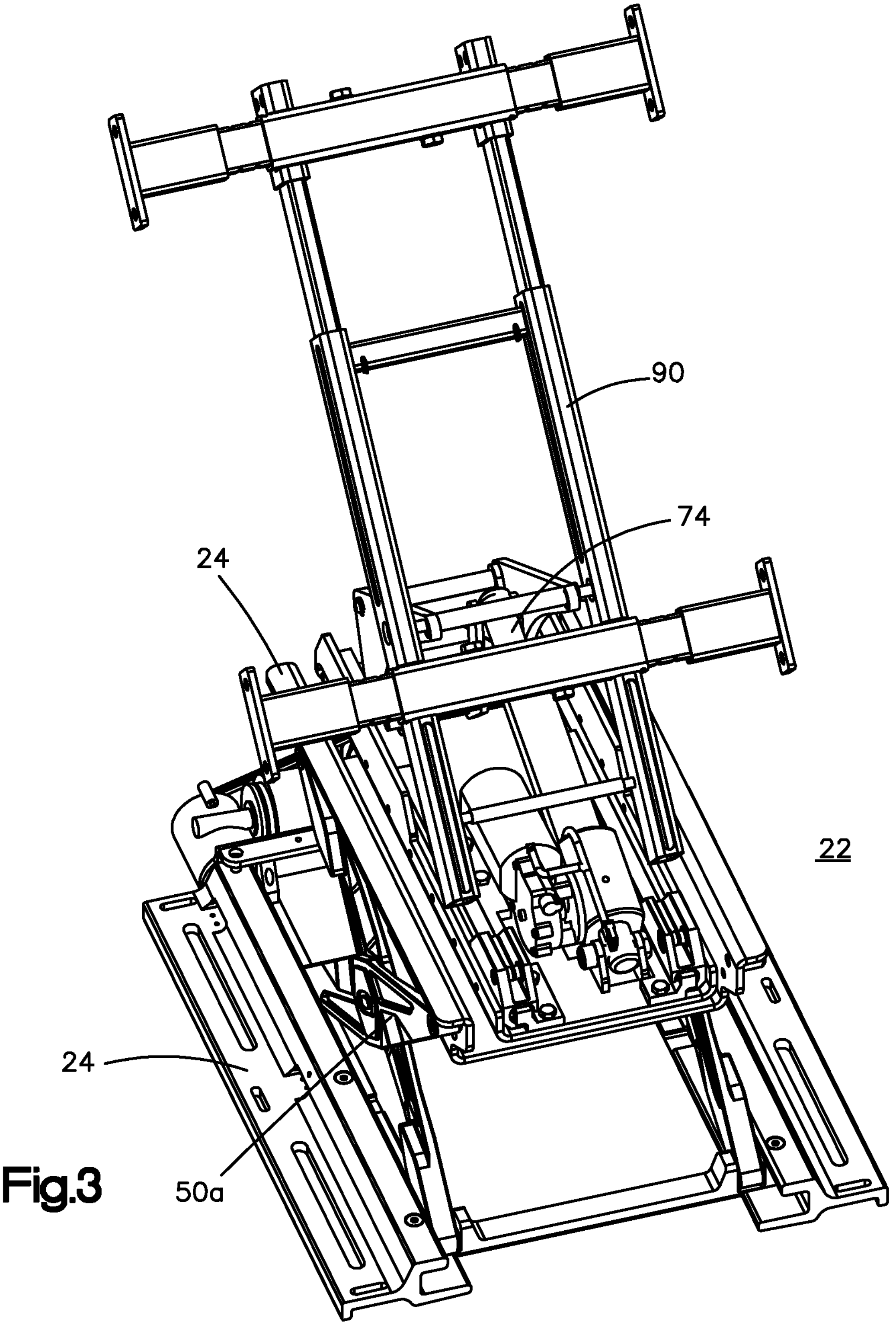
FIG. 3 is an image of the lift mechanism and the tilt mechanism in their extended positions.
Figure 4:
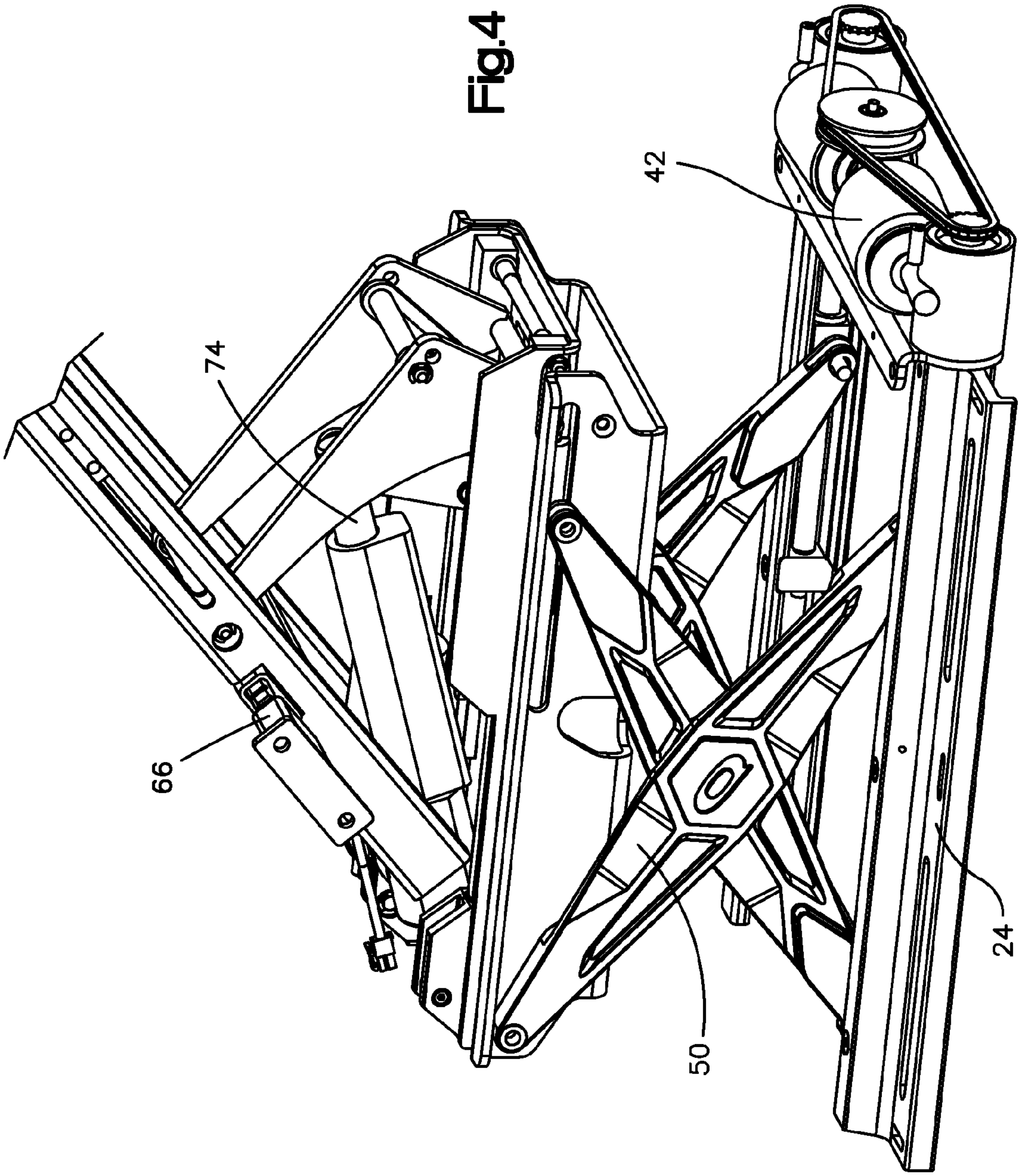
FIG. 4 is a side image of the lift mechanism nearly fully retracted and the tilt mechanism extended.

A power wheelchair 10 (FIG. 1) includes a power base 12 and a chair assembly 18. Power base 12 includes a frame 13, wheels including a pair of drive wheels 14, a suspension (not identified by a reference numeral), a pair of motors and drives (not shown in the figures) for powering the drive wheels 14, a battery pack, and a controller for accepting user input and controlling motors and other wheelchair functions. The battery pack and controller are not shown in the figures. Preferably, power base 12 is conventional, and the present invention encompasses other powerbases, such as bases having four drive wheels and other variations.

Chair assembly 18 includes a lift unit 22, a tilt unit 70, and a seat assembly 90, as shown in FIGS. 2A, 2B, 13A, and 13B. Seat assembly 90 includes a seat base 92 and a seat back 94, each of which is pivotable relative to power base frame 13. Chair assembly 18 defines a main axis A that is horizontal and parallel to a forward-rearward direction of the chair.

FIGS. 7 through 9 and 14 illustrate lift mechanism or lift unit 22 separated from other structure for clarity. Lift unit 22 includes a frame 24, a pair of actuators 26, a power system 28, and a lift mechanism 30. Frame 24 includes lateral structural members, preferably steel, that are parallel to main axis A and transverse members that connect between the lateral members. Frame 24 includes slots or holes 25 for connecting to power base frame 13 by fasteners, such as bolts.

The actuators include a first actuator 26*a* and a second actuator 26*b* that are located on opposing sides of chair assembly 18 parallel to main axis A. Actuators 26*a* and 26*b* preferably are oriented horizontally or parallel to the top surface of power base frame 13 for efficient use of space, but the present invention encompasses actuators (not shown in the figures) that are not horizontal and/or not parallel to the top of frame 13. As shown in the figures, and illustrated in FIG. 7 by the removal of some structure of the lift mechanism, each of actuators 26*a* and 26*b* preferably is a power screw that includes a screw 32, a proximal end support 34, a distal end support 36, and a nut 38.

Figure 5:
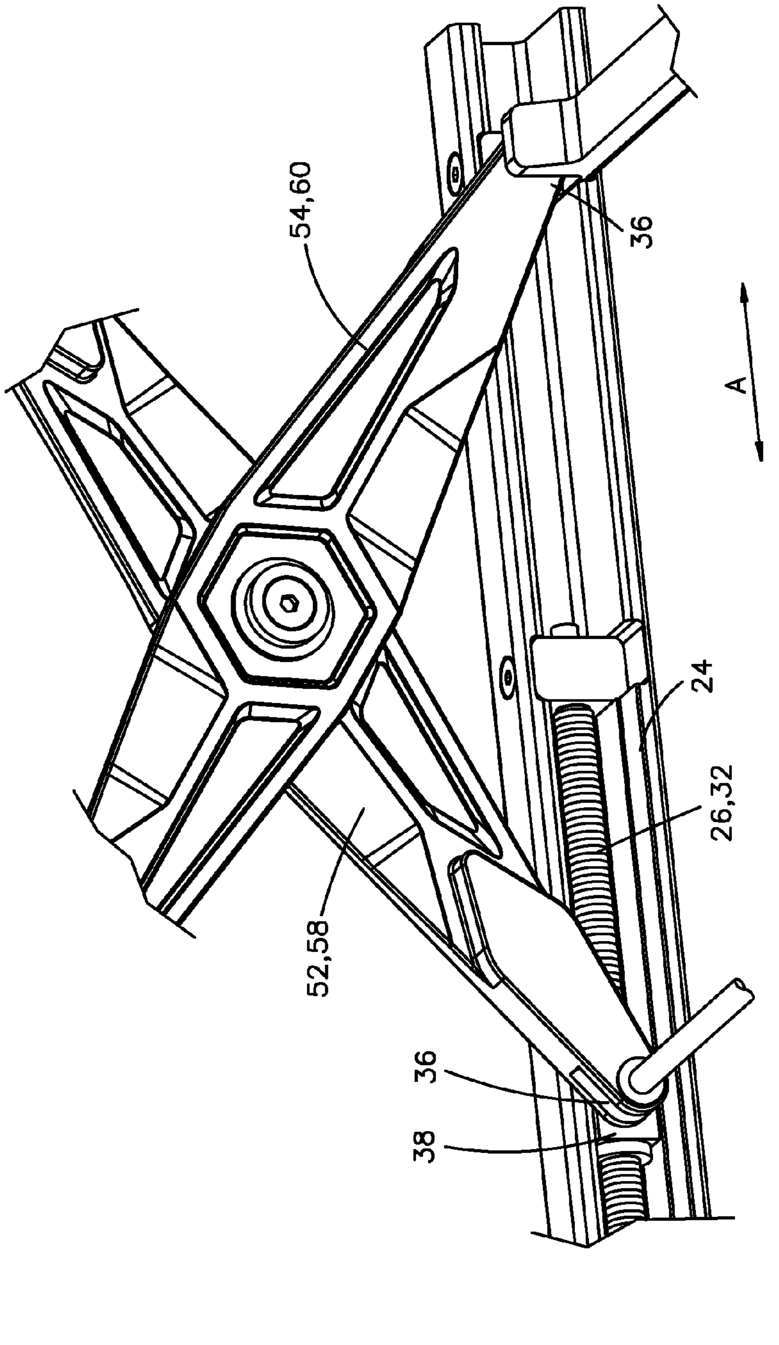
FIG. 5 is an image of a portion of the lift mechanism in its extended position.
Figure 6:
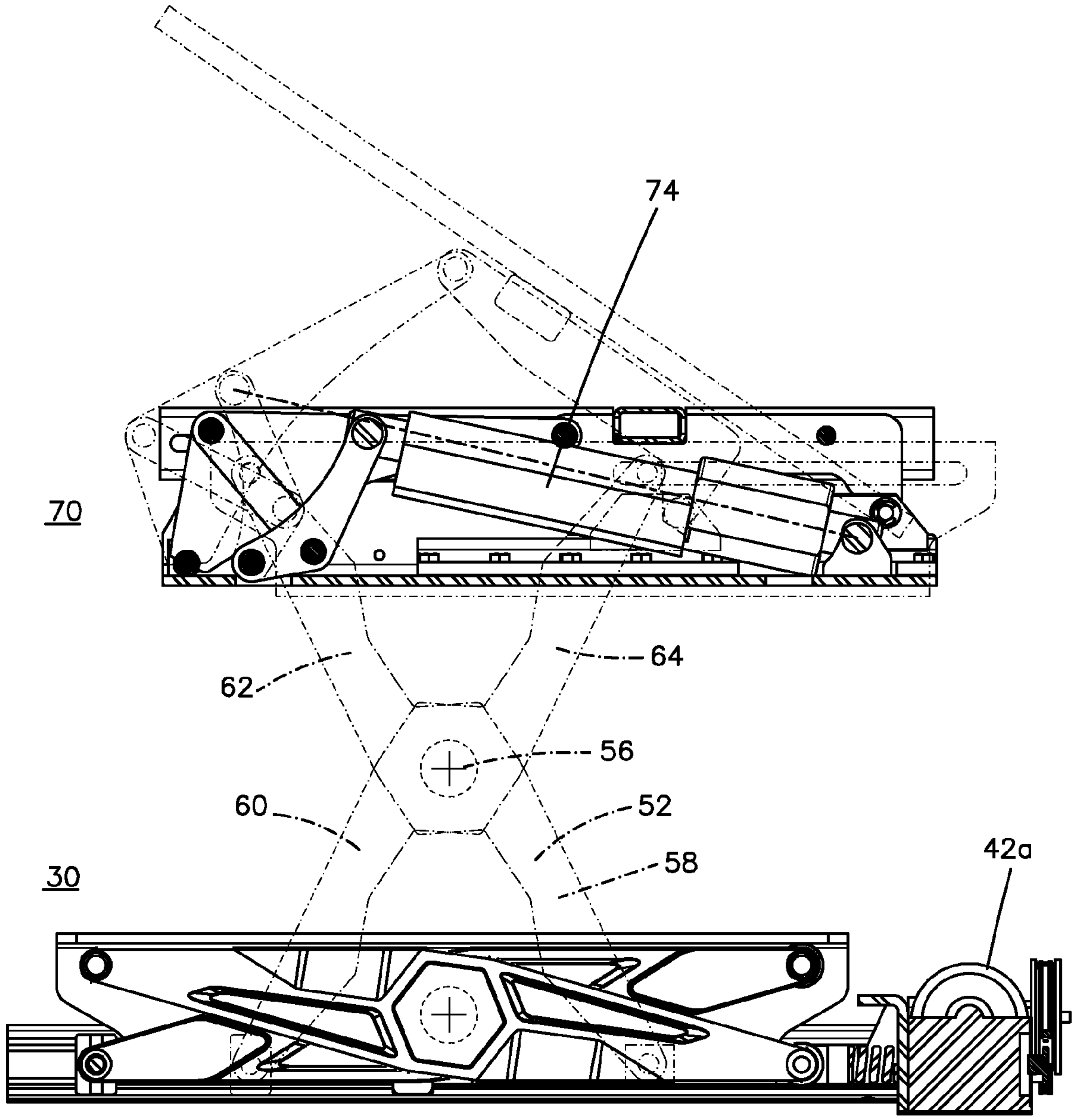
FIG. 6 is a side view of the lift mechanism and the tilt mechanism, each in its retracted position, and showing each in its extended position in relief
Figure 7:
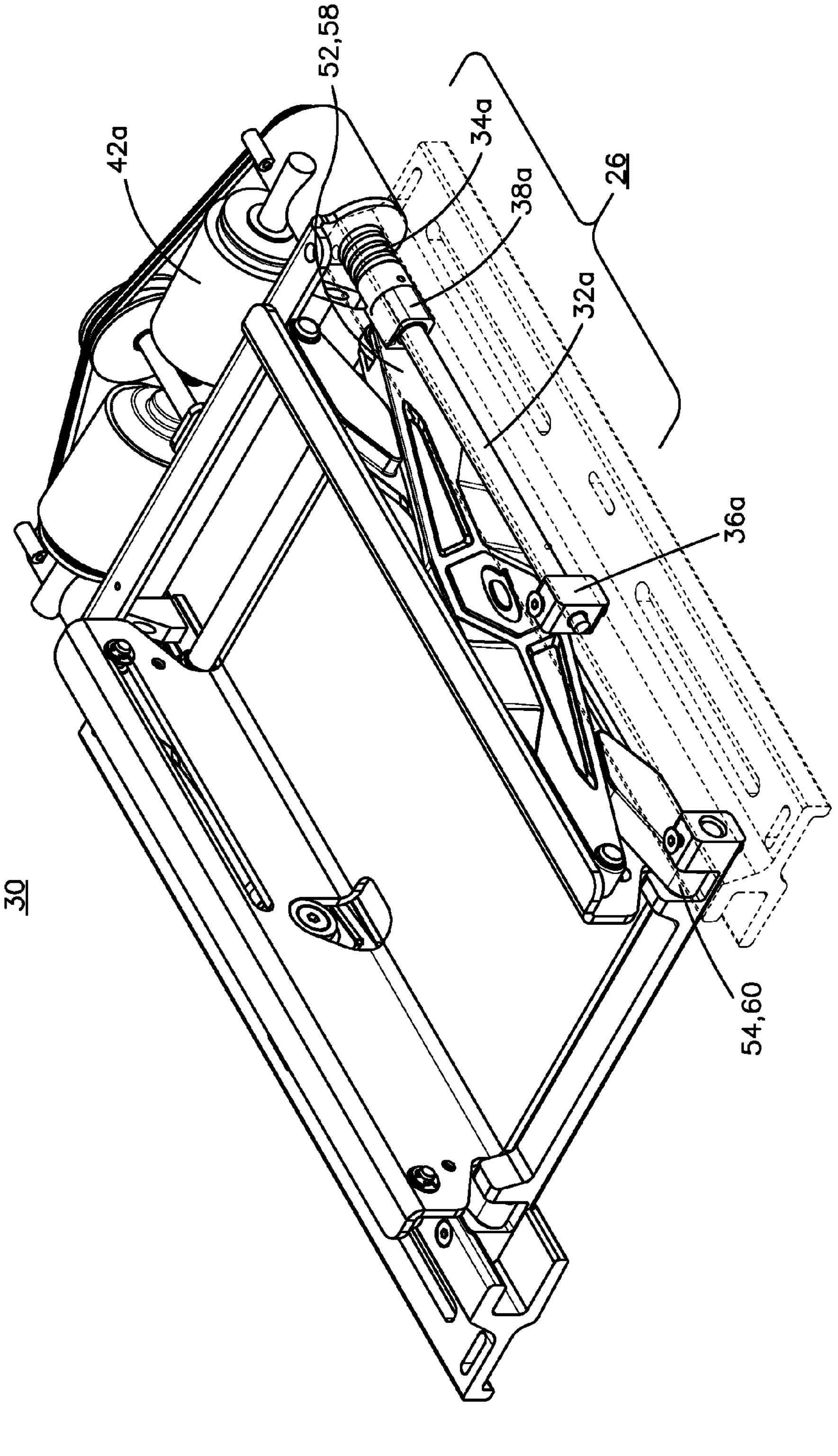
FIG. 7 is a perspective view of the lift mechanism with the tilt mechanism removed for clarity. The lift mechanism is shown in its retracted position with a portion of the frame removed to show the screw.
Figure 8:
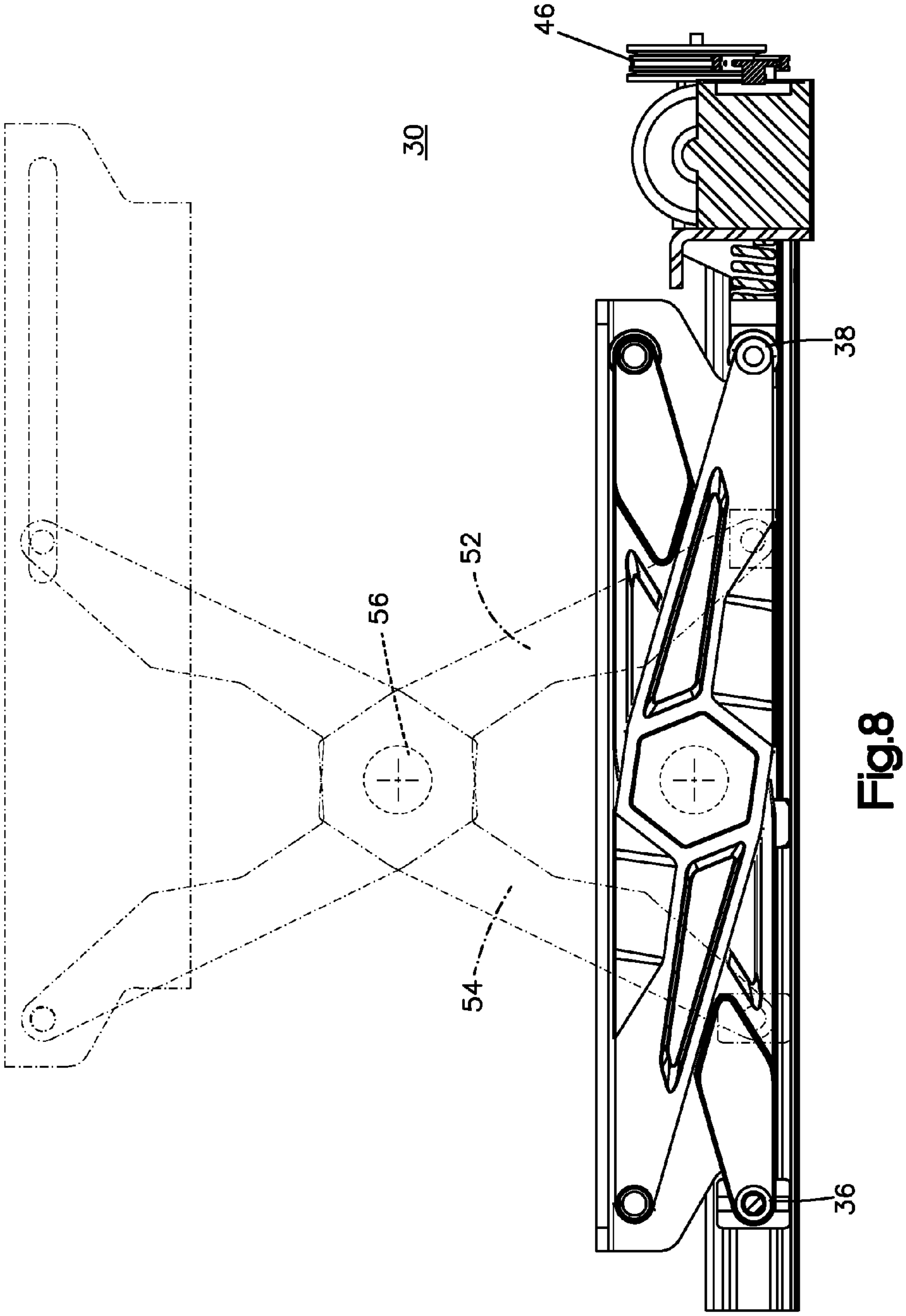
FIG. 8 is a side view of the lift mechanism with the tilt mechanism and some structure of the lift mechanism removed for clarity. The lift mechanism is shown in its retracted position and shown in its extended position in relief.
Figure 9:
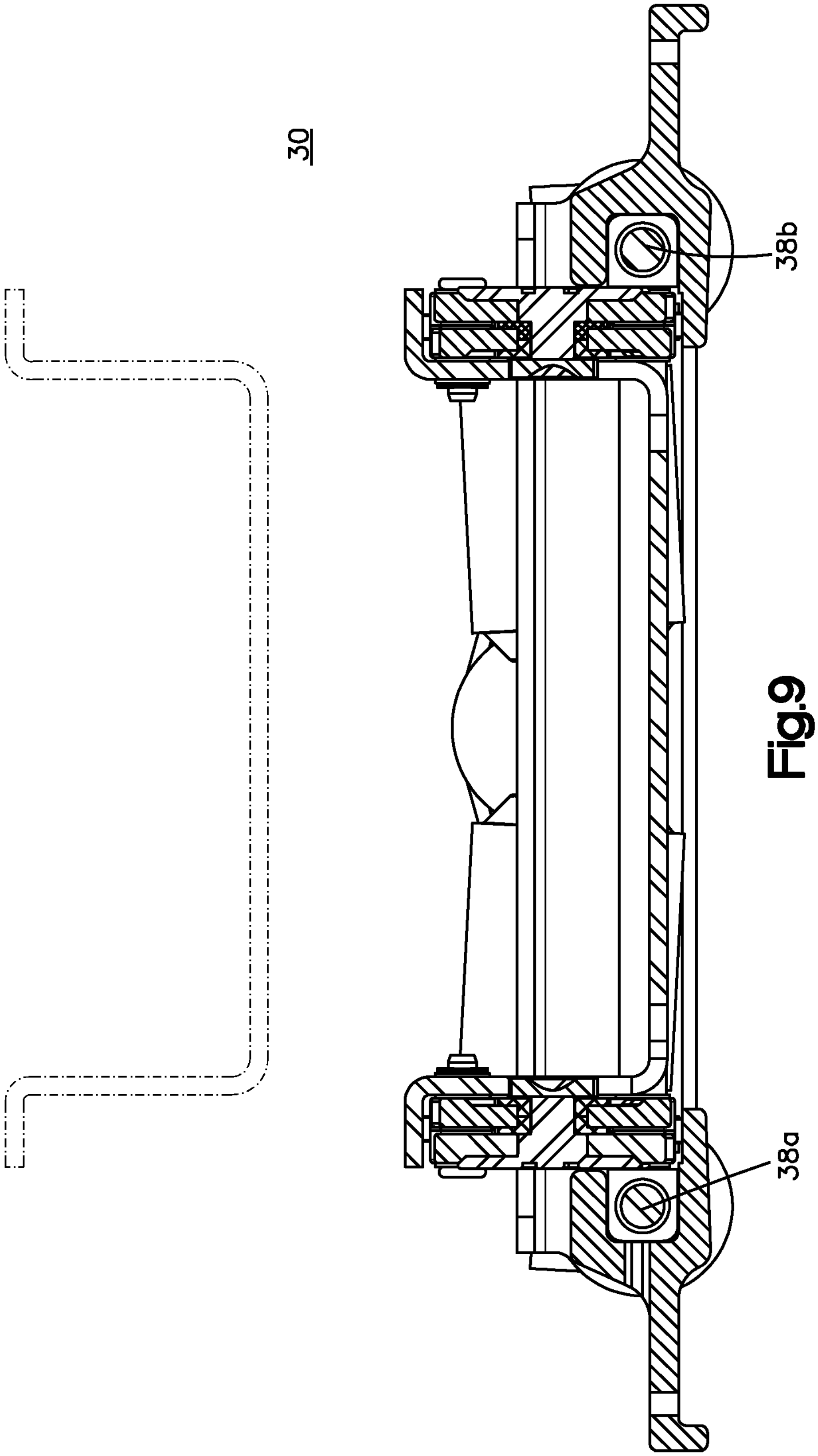
FIG. 9 is a cross sectional view of the lift mechanism with the tilt mechanism and some structure of the lift mechanism removed for clarity.
Figure 10A:
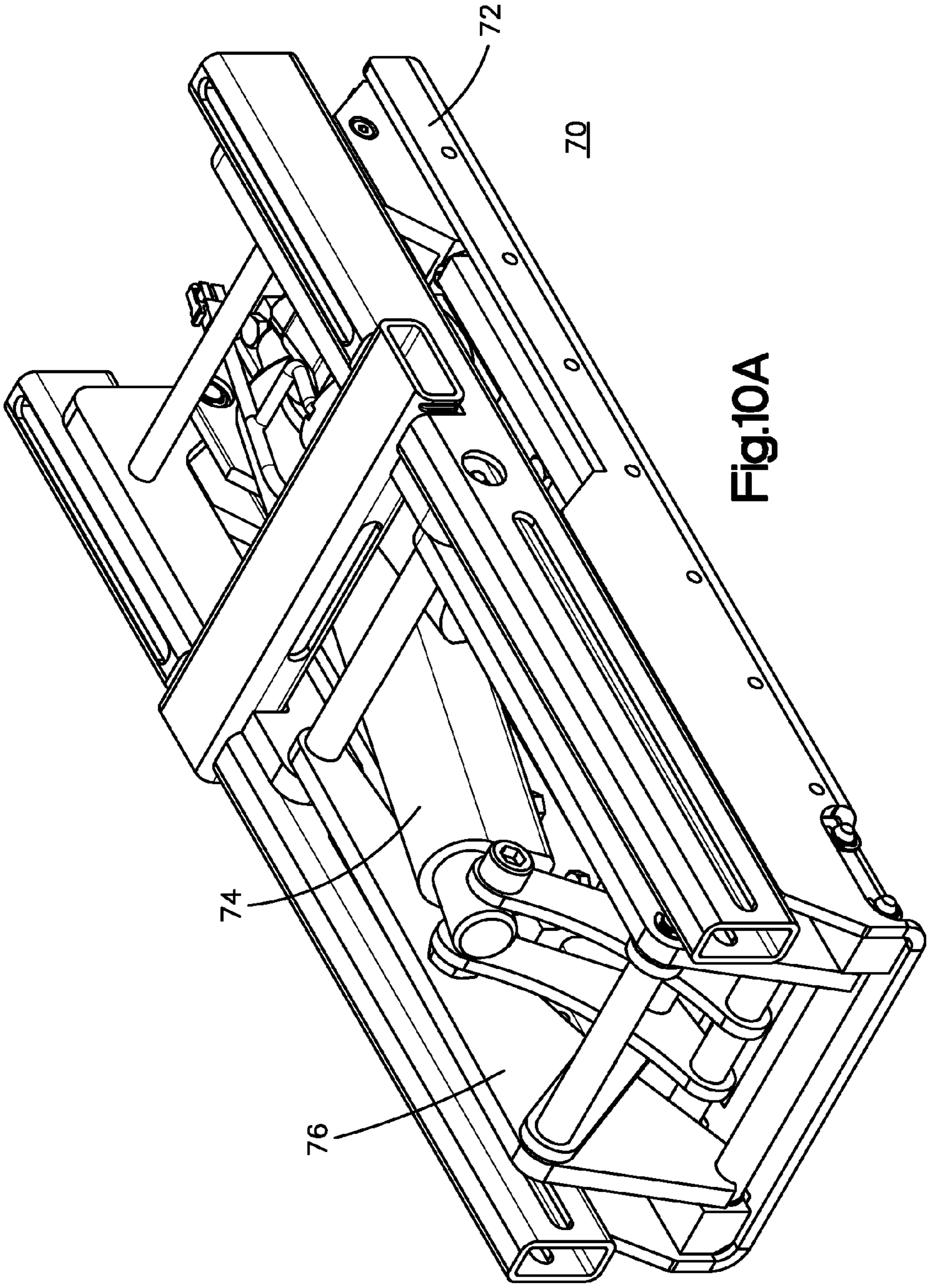
FIG. 10A is a perspective view of the tilt mechanism shown in its retracted position.
Figure 10B:
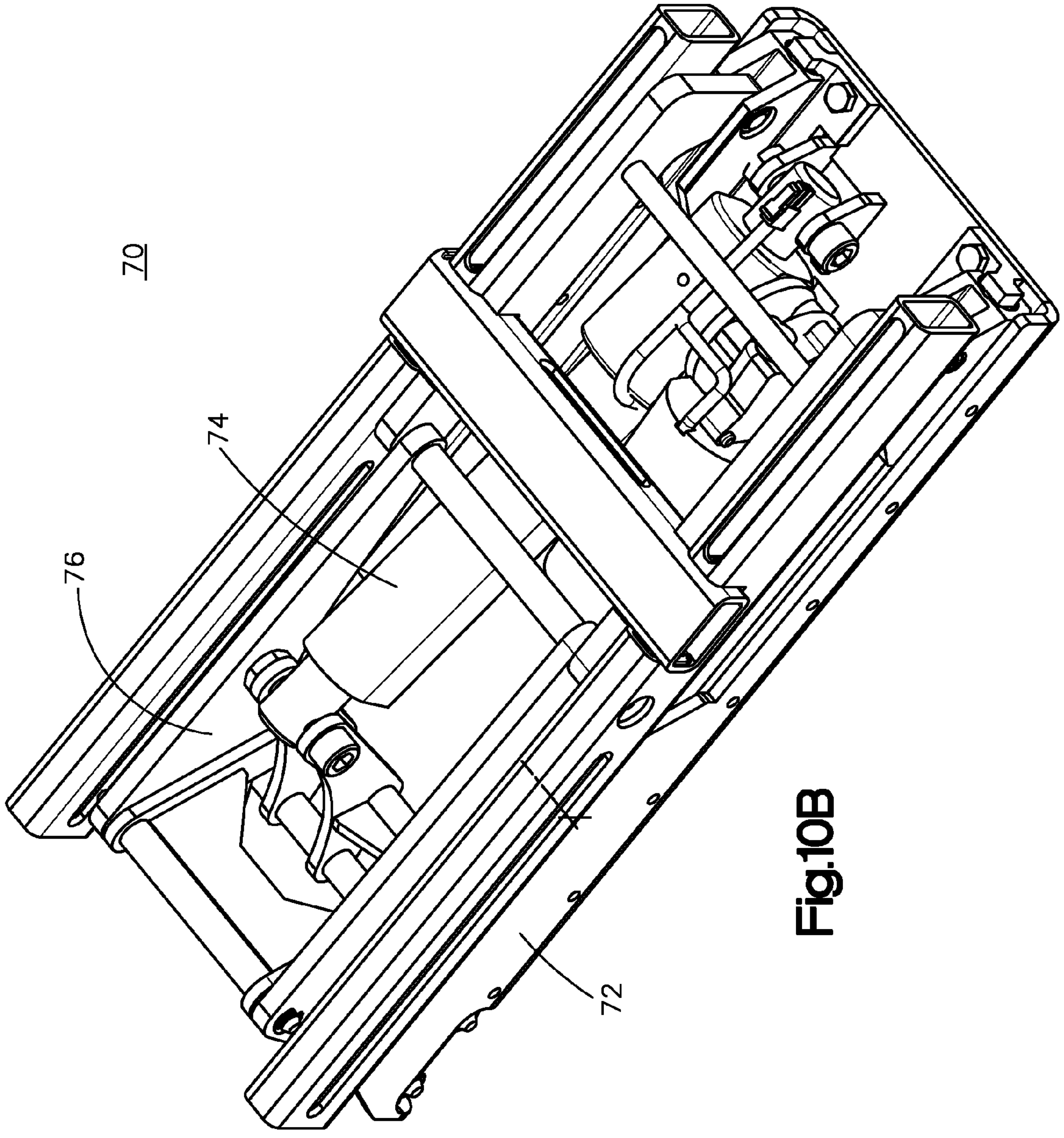
FIG. 10B is another perspective view of the tilt mechanism shown in its retracted position.
Figure 11:
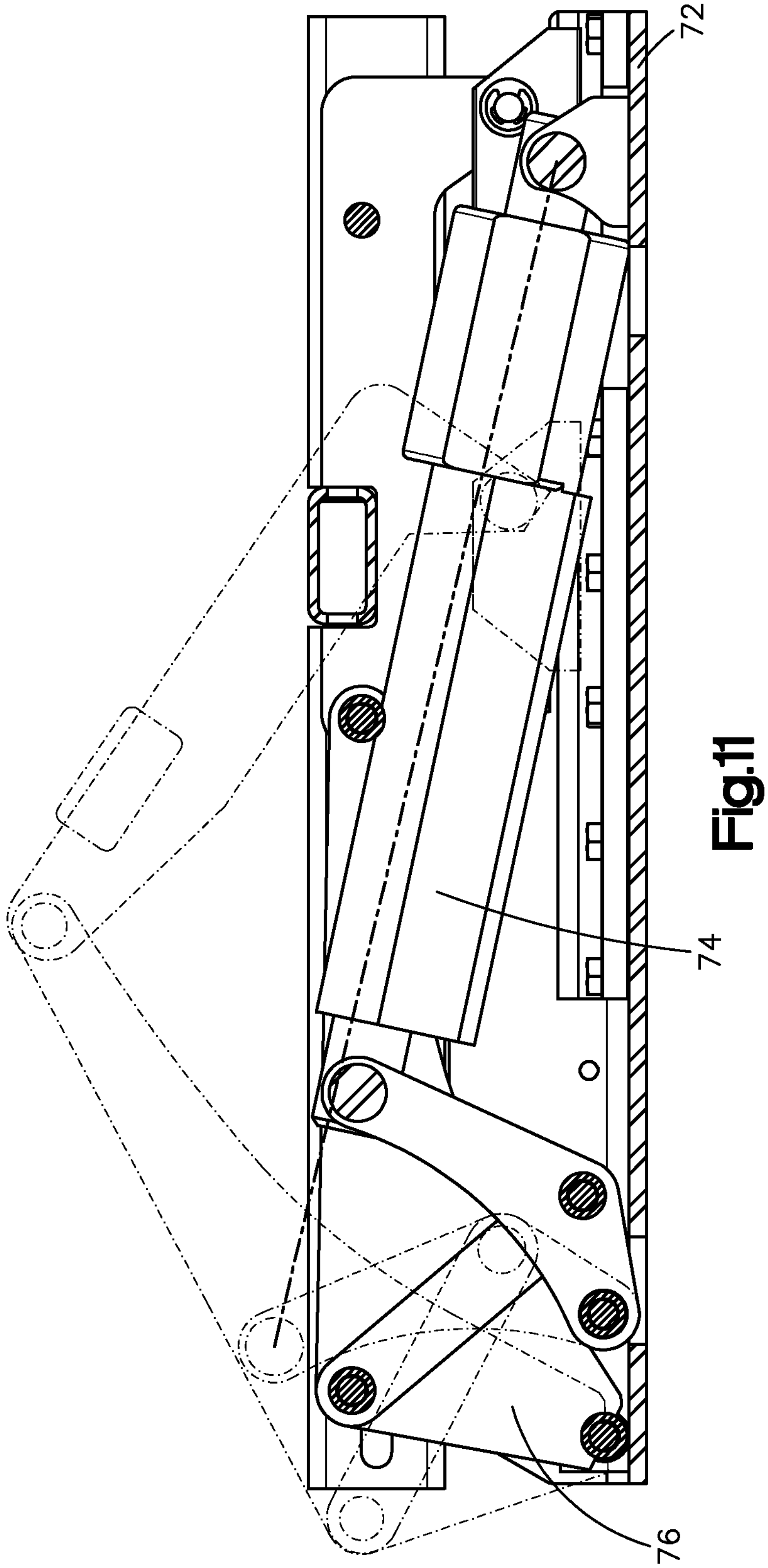
FIG. 11 is a side view of the tilt mechanism with some structure of the tilt mechanism removed for clarity.
Figure 12B:
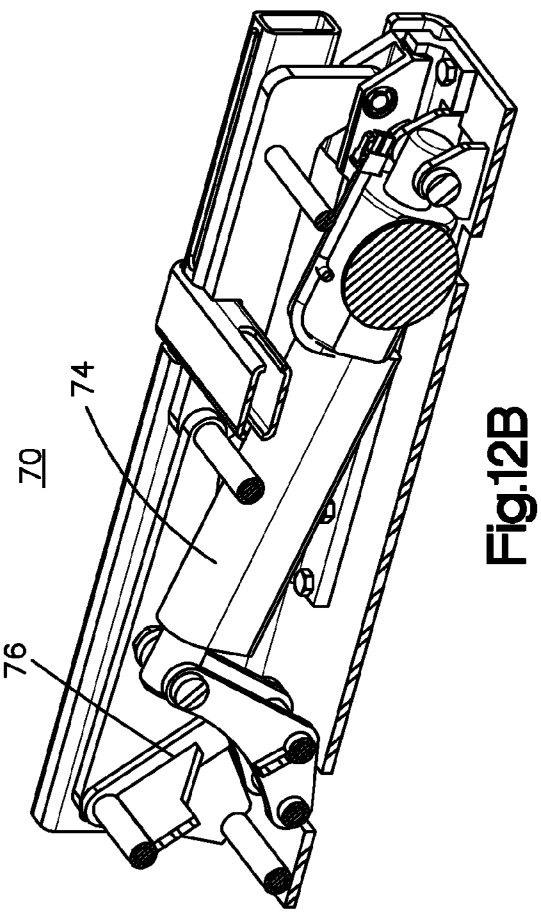
FIGS. 12A, 12B, 12C, and 12D are perspective views of a portion of the tilt mechanism in its retracted position.
Figure 12C:
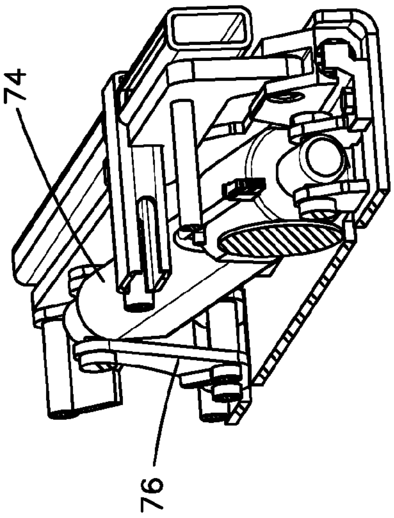
Figure 12A:
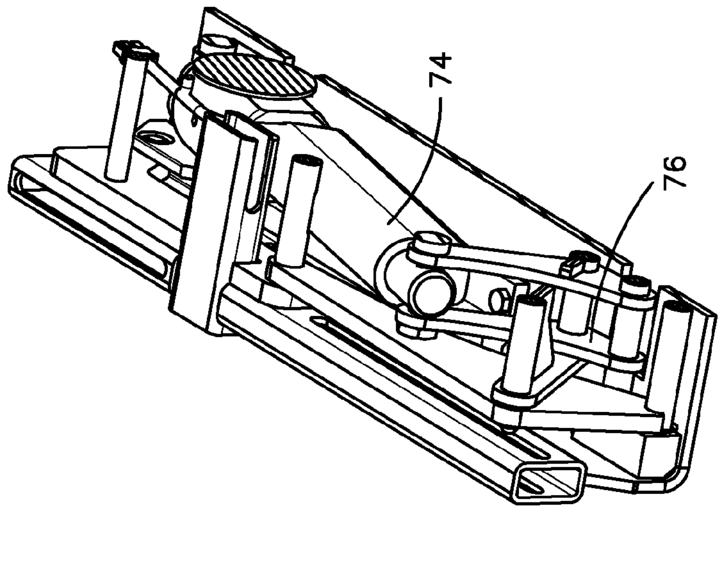
Figure 12D:
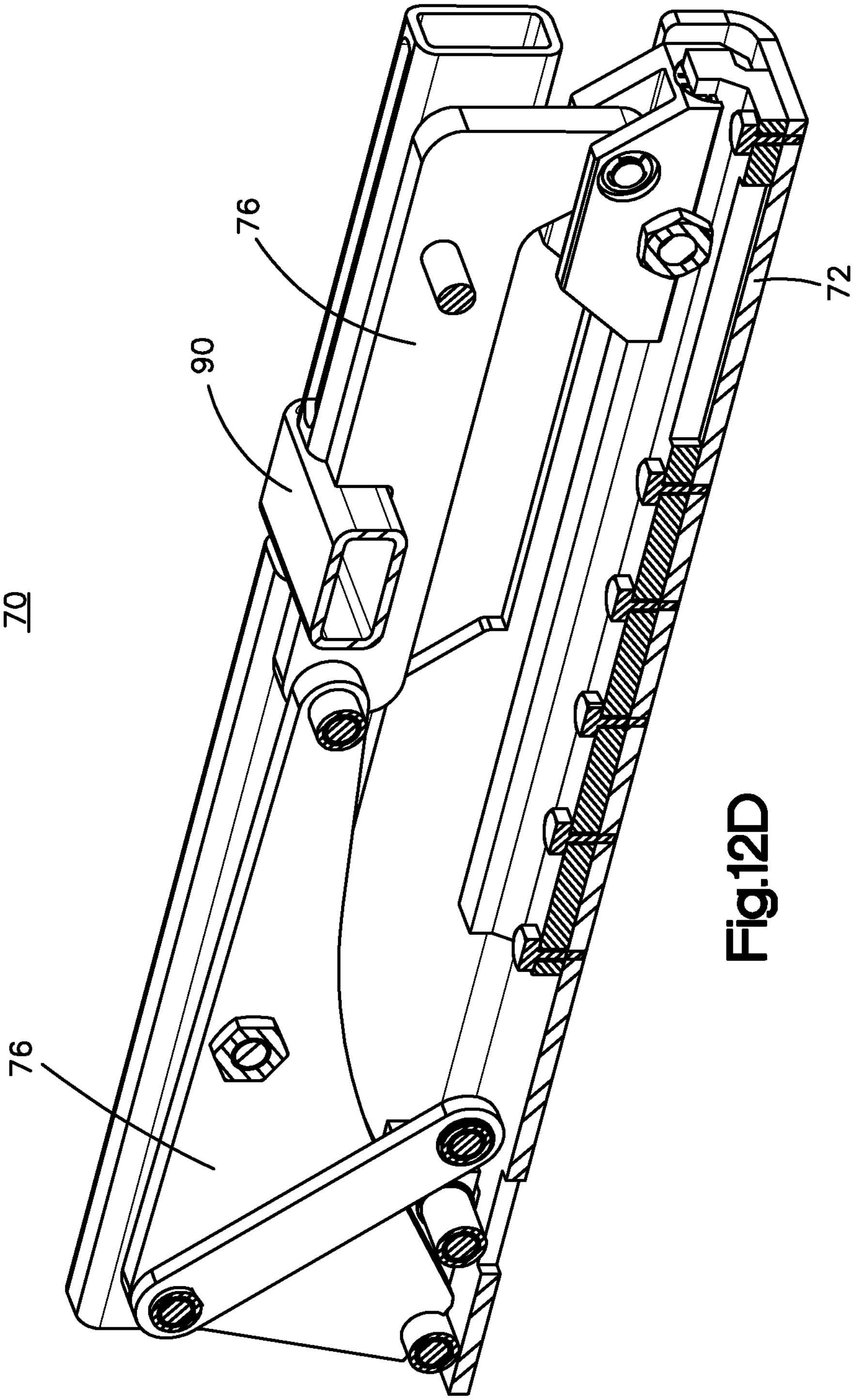
Figure 13A:
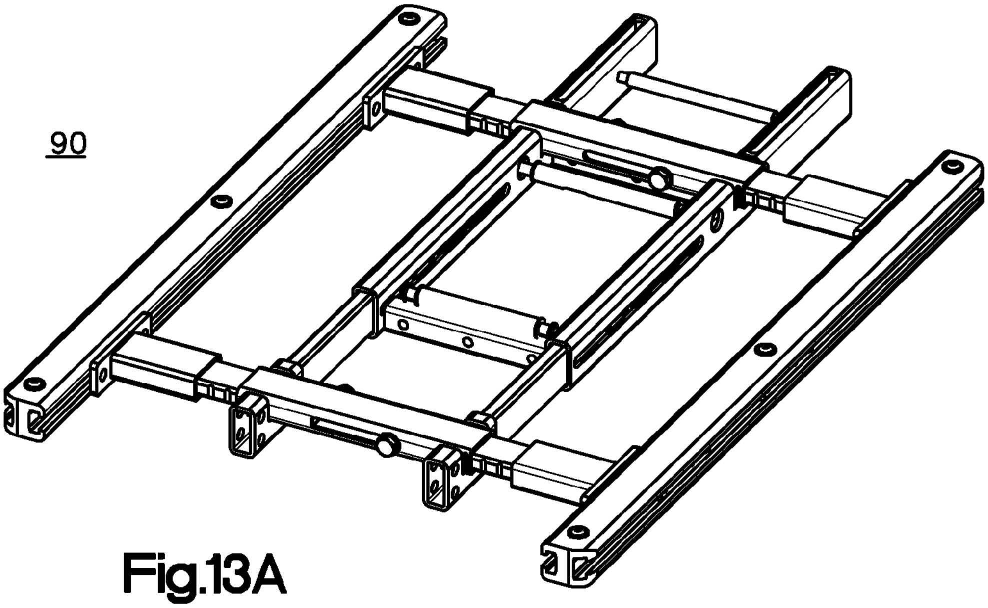
FIGS. 13A and 13B are perspective views of a portion of the seat base assembly that is coupled to the tilt mechanism.
Figure 13B:
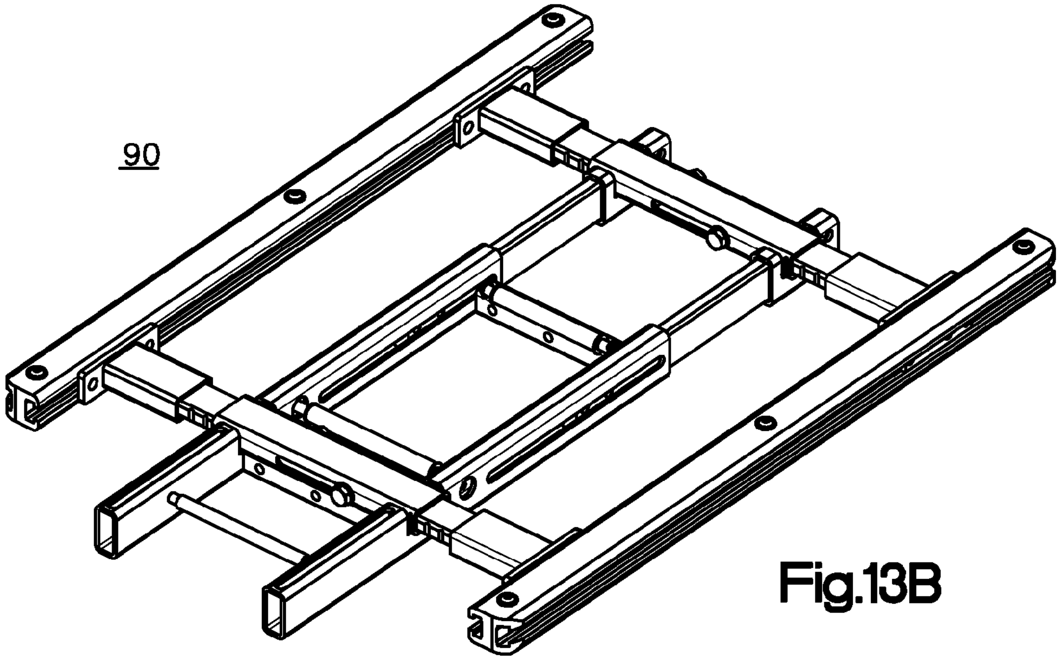
Figure 14:
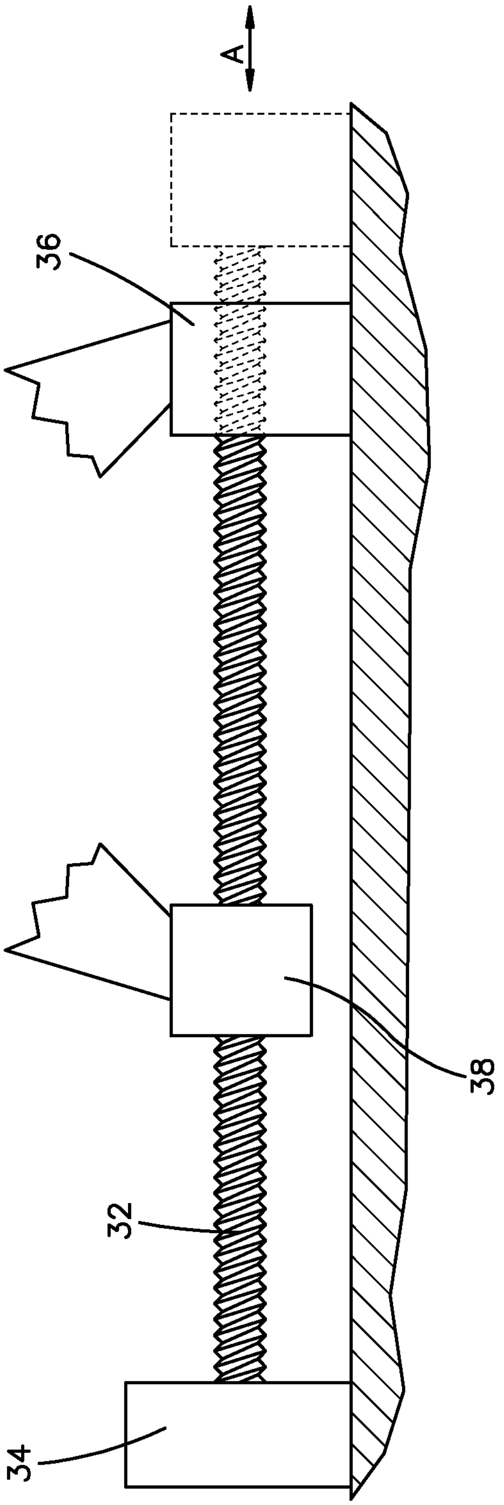
FIG. 14 is a schematic of the screw mechanism of the lift mechanism.
Figure 15A:
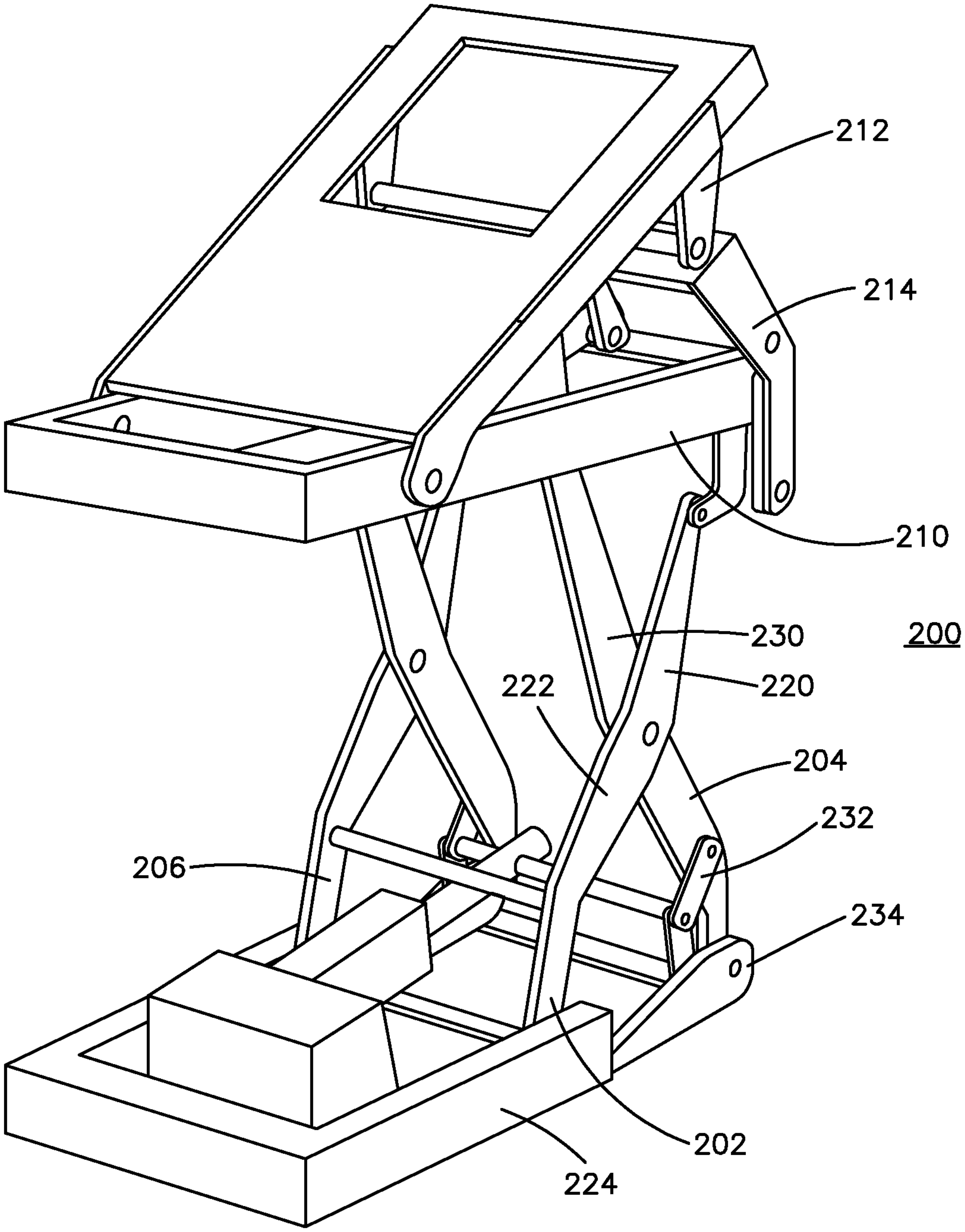
Fig.15A PRIOR ART
FIG. 15A is an image of a prior art lift and tilt mechanism in which the tilt mechanism stacks on top of the lift mechanism.
Figure 15B:
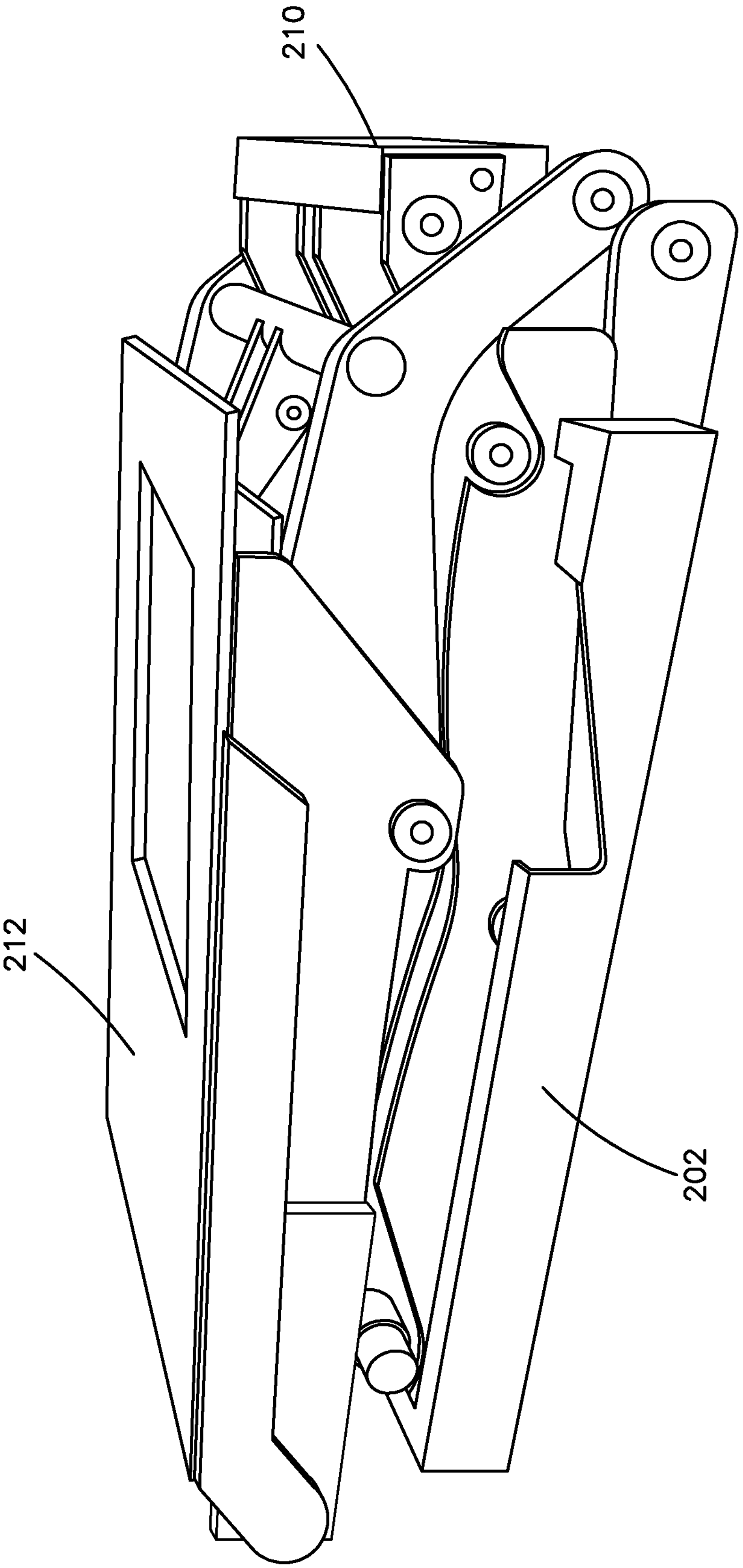
Fig.15B PRIOR ART
FIG. 15B is an image of the prior art lift and tilt mechanism of FIG. 15A shown in its retracted position.

As shown in FIGS. 5, 7, and 14, proximal end support 34 is located near the rear of seat assembly 90 and distal end support 36 is located forward of the proximal end support 34 such that screw 32 extends forward, but the opposite orientation is contemplated. Each one of supports 34 and 36 are supported on lift system frame 24. Nut 38 is prevented from rotation such that rotation of screw 32 causes translation of nut 38. Preferably actuators 26*a* and 26*a* are commercially available acme screws. Throughout the specification, a reference numeral appended with an "a" and a "b" designation generally refers to left and right structures or components. When the specification intends to refer generally to the structure or component without regard to whether it is the left or right one, the reference numeral lacks the appended letter.

Power system 28 includes a pair of electric motors 42*a* and 42*b* that are supported on lift frame 24. The output shafts 44*a* and 44*b* are operatively coupled to the inputs of power screws 32*a* and 32*b*. A timing chain 46 runs between opposing sprockets 48*a* and 48*b* that are mechanically connected to the inlet sides of power screws 32*a* and 32*b* to synchronize the operation of screws 32*a* and 32*b*. Other drive means and synchronization methods are contemplated. FIG. 2 shows an option in which both the front and rear of frame 24 each include a pair of electric motors 42*a* and 42*b* and a timing chain 46. In the embodiment of FIG. 2, the power screws extend between the motor assemblies such that each end of each screw is driven.

Lifting mechanism 30 includes a pair of opposing scissor mechanisms 50*a* and 50*b*, each of which includes a first scissor leg 52 and a second scissor leg 54 that are joined together at pivot 56. Preferably, legs 52 and 54 are bars that are approximately flat and oriented parallel to the main axis A. First leg 52 includes a lower end 58 that is located rearward from a lower end 60 of second leg 54. First leg 52 also includes an upper end 62 that is located forward from an upper end 64 of second leg 54. First lower end 58 is pivotably connected to nut 38 and second lower end 60 is pivotally connected to fixed power screw support 36, lift frame 24, or power base frame 13. Upper ends 62 and 64 are operatively coupled to tilt unit 70 by pivotable or slideable connections to raise and alternately lower tilt unit 70.

Upon supply of electricity from the wheelchair battery pack in response to a signal from the controller, lift motors 42 operate to turn screws 32*a* and 32*b*, which are synchronized via timing chain 46. As screws 32*a* and 32*b* turn, nuts 38*a* and 38*b* translate to move first leg lower ends 58*a* and 58*b* either toward or away from second leg lower ends 60*a* and 60*b* depending on the direction of screw rotation. In this way, scissor mechanisms 50*a* and 50*b* are operated to lower or raise seat base 92 and/or tilt unit 70.

FIGS. 10 through 13 illustrate the tilt mechanism or tilt unit 70. Tilt unit 70 includes a frame 72, an actuator 74, and a tilt mechanism 76. Frame 72 preferably is formed of structural steel and includes pivotable connections for first scissor leg upper end 62 and a pivotable and slideable connection for second scissor leg upper end 64. Actuator 74 may be a linear actuator of any type, preferably is electrically powered, and preferably includes proximal end that is attached to frame 72 and a distal end that is attached to lift mechanism frame 72.

Upon supply of power to actuator 74, tilt mechanism 76 may tilt the seat of wheelchair. As for example shown in FIG. 12D, elements of the seat base structure 90 are connected to the tilt mechanism structure 76 such that upon movement of actuator 74, the upper structure of tilt mechanism tilts the seat base structure 90. In most circumstances, the tilt mechanism is oriented to pivot the occupant rearward or backward from an upright sitting position to a laid back position.

Tilt unit frame 72 is coupled to lift mechanism frame 24 to enable tilt unit frame 72 to be removeable from lift mechanism frame 24. Accordingly, either one of lift unit 30 to tilt unit 70, or neither, may be fitted into a power wheelchair. The unit 30 and/or 70 may be added by a retrofit. Only conventional fasteners would be required to add either unit to the wheelchair.

A preferred embodiment of a lift mechanism and a tilt mechanism has been used to illustrate aspects and advantages of the present invention. The invention is not limited to the specific structure shown or described herein, nor is it required that the invention embody every aspect or advantage described in the specification or claimed. Rather, each claim is intended to be entitled to its full scope.

The invention claimed is:

1. A chair assembly for a power wheelchair, the chair assembly comprising:

a seat assembly including a seat base and a seat back;

a tilt cartridge unit including an actuator, a linkage, and a frame; the actuator being configured to tilt the seat assembly in response to a signal from a controller;

a lift cartridge unit including left and right linear actuators and left and right scissor mechanisms, the left linear actuator operatively coupled to the left scissor mechanism and the right linear actuator operatively coupled to the right mechanism, each scissor mechanism including first and second scissor legs, the left linear actuator and left scissor mechanism being located on an opposing side of the chair assembly from the right linear actuator and right scissor mechanism to define a central space therebetween in which the tilt mechanism nests at least when the tilt cartridge unit is in a retracted position; and the linear lift actuators being configured to vertically lift the seat base, without tilting the seat base, in response to a signal from a controller, and the tilt actuator being configured to tilt the seat base, without lifting the seat base, in response to a signal from the controller, wherein each one of the linear actuators is a power screw that translates a nut, the first scissor leg having a translatable end that translates along with the nut.

2. The chair assembly of claim 1 wherein each one of the left and right scissor mechanisms includes at least one moveable connection to a portion of the corresponding actuator.

3. The chair assembly of claim 1 wherein each one of the translatable ends of the first legs are supported entirely from the nut and are not supported by the frame.

4. The chair assembly of claim 1 wherein each one of the second scissor legs has a lower end that is longitudinally fixed by the frame.

5. The chair assembly of claim 1 wherein the tilt cartridge unit consists of a single module that is removable from the seat assembly and from the lift cartridge unit as a module.

6. The chair assembly of claim 1 wherein the lift cartridge unit consists of a single module that is removable from the seat assembly and from the tilt cartridge unit as a module.

7. The chair assembly of claim 1 wherein the linear actuators are oriented parallel to a forward-rearward axis of the chair assembly.

8. The chair assembly of claim 7 wherein the legs are bars that are oriented parallel to the forward rearward axis.

9. A method of operating a power wheelchair that includes a seat lift feature and a seat tilt feature, the method comprising the steps of:

in response to a signal from a controller, operating a tilt actuator that is part of a tilt unit such that operation of the tilt actuator tilts a seat base frame;

in response to a signal from a controller, operating left and right linear lift actuators that are attached to left and right scissor mechanisms such that operation of the actuators operates the left and right scissor mechanisms for vertical movement of the seat base frame, the left and right actuators and the left and right scissor mechanisms are laterally spaced apart such that upon retraction of the scissor lift mechanisms the tilt unit nests in the space between the lift actuators.

10. The method of claim 9 wherein the step of operating the lift actuators includes translating a moveable connection of each one of the left and right scissor mechanisms.

11. The method of claim 10 wherein each one of the linear actuators is a power screw and the moveable connection includes a nut that is pivotably coupled to an end of a first scissor leg of each one of the left and right scissor mechanisms.

12. The method of claim 11 wherein each translatable leg is supported entirely from the nut and is not supported by the frame.

13. The method of claim 12 wherein each one of the second a fixed leg that is pivotably coupled to the frame, is not translatable on the frame, and I supported by a frame.

14. The method of claim 9 wherein the tilt cartridge unit consists of a single module that is removable from the seat assembly and from the lift cartridge unit as a module.

15. The method of claim 9 wherein the lift cartridge unit consists of a single module that is removable from the seat assembly and from the tilt cartridge unit as a module.

16. The method of claim 9 wherein the linear actuators are oriented parallel to a forward-rearward axis of the chair assembly.

17. The chair assembly of claim 16 wherein the legs are bars that are oriented parallel to the forward rearward axis.

18. A chair assembly for a power wheelchair, the chair assembly comprising:

a seat assembly including a seat base and a seat back;

a tilt cartridge unit including an actuator, a linkage, and a frame; the actuator being configured to tilt the seat assembly in response to a signal from a controller;

a lift cartridge unit including left and right linear actuators and left and right scissor mechanisms on opposing sides of the chair assembly, each one of the scissor mechanisms including a first leg and a second leg, an end of the first scissor leg being structurally supported by a translatable element of the actuator without direct support by the frame during operation of the actuator, an end of the second scissor leg being structurally supported by the frame; and at least one drive for operating the actuator.

19. The chair assembly of claim 18 wherein the actuator translation is approximately horizontal.

20. The chair assembly of claim 18 wherein the actuator is a power screw and the translatable element is a nut, and the end of the first scissor leg is pivotally connected to the nut.

21. The chair assembly of claim 20 wherein each one of the second scissor legs has a fixed leg that is pivotably supported by a frame such that operation of the actuator translates an end of the first leg to extend or retract the scissor mechanisms.

22. The chair assembly of claim 20 wherein the opposing the power screws and scissor mechanisms being define a central space therebetween in which the tilt mechanism nests at least when the tilt cartridge unit is in a retracted position.

23. The chair assembly of claim 18 wherein the linear actuators are oriented parallel to a forward-rearward axis of the chair assembly.

24. The chair assembly of claim 23 wherein the legs are bars that are oriented parallel to the forward rearward axis.

25. The chair assembly of claim 18 wherein the tilt cartridge unit consists of a single module that is removable from the seat assembly and from the lift cartridge unit as a module.

26. The chair assembly of claim 18 wherein the lift cartridge unit consists of a single module that is removable from the seat assembly and from the tile cartridge unit as a module.

27. The chair assembly of claim 18 wherein the lift actuators are configured to vertically lift the seat base, without tilting the seat base, in response to a signal from a controller, and the tilt actuator being configured to tilt the seat base, without lifting the seat base, in response to a signal from the controller.

28. A power wheelchair having lift and tilt capabilities, the wheelchair comprising:

a power base that includes a frame, wheels, a suspension, at least one motor for driving at least some of the wheels, and a controller;

a seat assembly including a seat base and a seat back;

wherein the power base is configured to receive:

a tilt module including an actuator, a linkage, and a frame the tilt module being connectable to the seat assembly as a standalone unit; and a lift module including at least one motor, left and right actuators and left and right scissor mechanisms, the left actuator operatively coupled to the left scissor mechanism and the right actuator operatively coupled to the right mechanism, each scissor mechanism including first and second scissor legs, the left actuator and left scissor mechanism being located on an opposing side of the chair assembly from the second actuator and second scissor mechanism to define a central space therebetween in which the tilt module is capable of nesting at least when the tilt cartridge unit is in a retracted position, wherein the lift actuator being configured to vertically lift the seat base, without tilting the seat base, in response to a signal from a controller, and the tilt actuator being configured to tilt the seat base, without lifting the seat base, in response to a signal from the controller.

29. The chair assembly of claim 28 wherein the lift actuator translation is approximately horizontal.

30. The chair assembly of claim 29 wherein the lift actuator is a power screw and the translatable element is a nut, and the end of the first scissor leg is pivotally connected to the nut.

31. The chair assembly of claim 30 wherein each one of the second scissor legs has a fixed leg that is pivotably supported by a frame such that operation of the actuator translates an end of the first leg to extend or retract the scissor mechanisms.

32. The chair assembly of claim 30 wherein the opposing the power screws and scissor mechanisms being define a central space therebetween in which the tilt mechanism nests at least when the tilt cartridge unit is in a retracted position.

33. The chair assembly of claim 28 wherein the linear actuators are oriented parallel to a forward-rearward axis of the chair assembly.

34. The chair assembly of claim 33 wherein the legs are bars that are oriented parallel to the forward rearward axis.

35. The chair assembly of claim 28 wherein the lift actuators are configured to vertically lift the seat base, without tilting the seat base, in response to a signal from a controller, and the tilt actuator being configured to tilt the seat base, without lifting the seat base, in response to a signal from the controller.

36. A chair assembly for a power wheelchair, the chair assembly comprising:

a seat assembly including a seat base and a seat back;

a tilt cartridge unit including an actuator, a linkage, and a frame; the actuator being configured to tilt the seat assembly in response to a signal from a controller;

a lift cartridge unit including left and right linear actuators and left and right scissor mechanisms, the left linear actuator operatively coupled to the left scissor mechanism and the right linear actuator operatively coupled to the right mechanism, each scissor mechanism including first and second scissor legs, the left linear actuator and left scissor mechanism being located on an opposing side of the chair assembly from the right linear actuator and right scissor mechanism to define a central space therebetween in which the tilt mechanism nests at least when the tilt cartridge unit is in a retracted position; and the linear lift actuators being configured to vertically lift the seat base, without tilting the seat base, in response to a signal from a controller, and the tilt actuator being configured to tilt the seat base, without lifting the seat base, in response to a signal from the controller, wherein the linear actuators are oriented in a forward-rearward direction of the chair assembly.

37. The chair assembly of claim 36 wherein each one of the left and right scissor mechanisms includes at least one moveable connection to a portion of the corresponding actuator.

38. The chair assembly of claim 36 wherein each one of the left and right lift actuators is a linear actuator that translates a portion of the first scissor leg.

39. The chair assembly of claim 38 wherein each one of the linear actuators is a power screw that translates a nut, the first scissor leg having a translatable end that translates along with the nut.

40. The chair assembly of claim 39 wherein each one of the translatable ends of the first legs are supported entirely from the nut and are not supported by the frame.

41. The chair assembly of claim 40 wherein each one of the second scissor legs has a lower end that is longitudinally fixed by the frame.

* * * * *